(12) United States Patent
Jagadeesan et al.

(10) Patent No.: US 10,311,230 B2
(45) Date of Patent: Jun. 4, 2019

(54) ANOMALY DETECTION IN DISTRIBUTED LEDGER SYSTEMS

(71) Applicant: Cisco Technology, Inc., San Jose, CA (US)

(72) Inventors: Ramanathan Jagadeesan, Saratoga, CA (US); Judith Ying Priest, Palo Alto, CA (US); Anoop Nannra, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/390,488

(22) Filed: Dec. 24, 2016

(65) Prior Publication Data

US 2018/0181751 A1 Jun. 28, 2018

(51) Int. Cl.
 *G06F 21/55* (2013.01)
 *H04L 29/06* (2006.01)
 *H04L 9/32* (2006.01)

(52) U.S. Cl.
 CPC .......... *G06F 21/552* (2013.01); *H04L 9/3239* (2013.01); *H04L 63/102* (2013.01); *H04L 63/1441* (2013.01); *H04L 2209/38* (2013.01)

(58) Field of Classification Search
 CPC .................................................... G06F 21/552
 USPC ......................................................... 726/23
 See application file for complete search history.

(56) References Cited

U.S. PATENT DOCUMENTS

| | | | | |
|---|---|---|---|---|
| 5,428,684 | A | * | 6/1995 | Akiyama ............... G06Q 20/02 235/380 |
| 7,793,835 | B1 | * | 9/2010 | Coggeshall ........... G06F 21/552 235/375 |
| 8,544,063 | B2 | * | 9/2013 | Watanabe ........... H04L 63/1408 709/225 |
| 8,768,804 | B2 | | 7/2014 | Holten et al. |
| 9,412,067 | B2 | | 8/2016 | Hawkins et al. |

(Continued)

OTHER PUBLICATIONS

Christopher Natoli and Vincent Gramoli; The Blockchain Anomaly; 11 pages; University of Sydney.

(Continued)

*Primary Examiner* — Teshome Hailu
(74) *Attorney, Agent, or Firm* — Behmke Innovation Group LLC; James Behmke; Stephen D. LeBarron (57) ABSTRACT

In various implementations, a method of identifying anomalies is performed by a first network node that is configured to maintain a distributed ledger in coordination with a plurality of network nodes. In various implementations, the first network node includes one or more processors, a non-transitory memory, and one or more network interfaces. In various implementations, the method includes determining a characteristic value based on information associated with the distributed ledger. In some implementations, the distributed ledger stores blocks of transactions that were added to the distributed ledger based on a consensus determination between the plurality of network nodes. In various implementations, the method includes determining whether a current transaction satisfies the characteristic value. In various implementations, the method include indicating whether there is an anomaly based on a function of the current transaction in relation to the characteristic value.

20 Claims, 7 Drawing Sheets

(56) References Cited

U.S. PATENT DOCUMENTS

| | | | |
|---|---|---|---|
| 2006/0133377 A1* | 6/2006 | Jain | H04L 63/1408 370/392 |
| 2009/0049547 A1* | 2/2009 | Fan | H04L 63/1425 726/22 |
| 2016/0086175 A1* | 3/2016 | Finlow-Bates | H04L 9/3271 705/77 |
| 2016/0203490 A1 | 7/2016 | Gupta et al. | |
| 2016/0224949 A1* | 8/2016 | Thomas | G06Q 20/027 |
| 2018/0032383 A1* | 2/2018 | Surcouf | G06F 21/602 |

OTHER PUBLICATIONS

Muneeb Ali and Jude Nelson; Blockstack: A Global Naming and Storage System Secured by Blockchains; 2016 USENIX Annual Technical Conference; Jun. 22-24, 2016; 15 pages; Denver, CO, USA.

* cited by examiner

ANOMALY DETECTION IN DISTRIBUTED LEDGER SYSTEMS

TECHNICAL FIELD

The present disclosure relates generally to anomaly detection, and in particular, to anomaly detection in distributed ledger systems.

BACKGROUND

Many traditional storage systems are centralized storage systems. In such storage systems, one or more servers serve as a central repository that stores information. The central repository is accessible to various client devices. The central repository is often managed by a business entity that typically charges a fee to access the central repository. In some instances, there is a transaction fee associated with each transaction. For example, there is often a transaction fee for writing information that pertains to a new transaction, and another transaction fee for accessing information related to an old transaction. As such, centralized storage systems tend to be relatively expensive. Some centralized storage systems are susceptible to unauthorized data manipulation. For example, in some instances, a malicious actor gains unauthorized access to the central repository, and surreptitiously changes the information stored in the central repository. In some scenarios, the unauthorized changes are not detected. As such, the information stored in a centralized repository is at risk of being inaccurate.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable identifying anomalies in a distributed ledger system. For example, in various implementations, a method of identifying anomalies is performed by a first network node that is configured to maintain a distributed ledger in coordination with a plurality of network nodes. In various implementations, the first network node includes one or more processors, a non-transitory memory, and one or more network interfaces. In various implementations, the method includes determining a characteristic value based on information associated with (e.g., stored in) the distributed ledger. In some implementations, the distributed ledger stores blocks of transactions that were added to the distributed ledger based on a consensus determination between the plurality of network nodes. In various implementations, the method includes determining whether a current transaction satisfies the characteristic value. In various implementations, the method includes indicating whether there is an anomaly based on a function of the current transaction in relation to the characteristic value.

Example Embodiments

Figure 1:
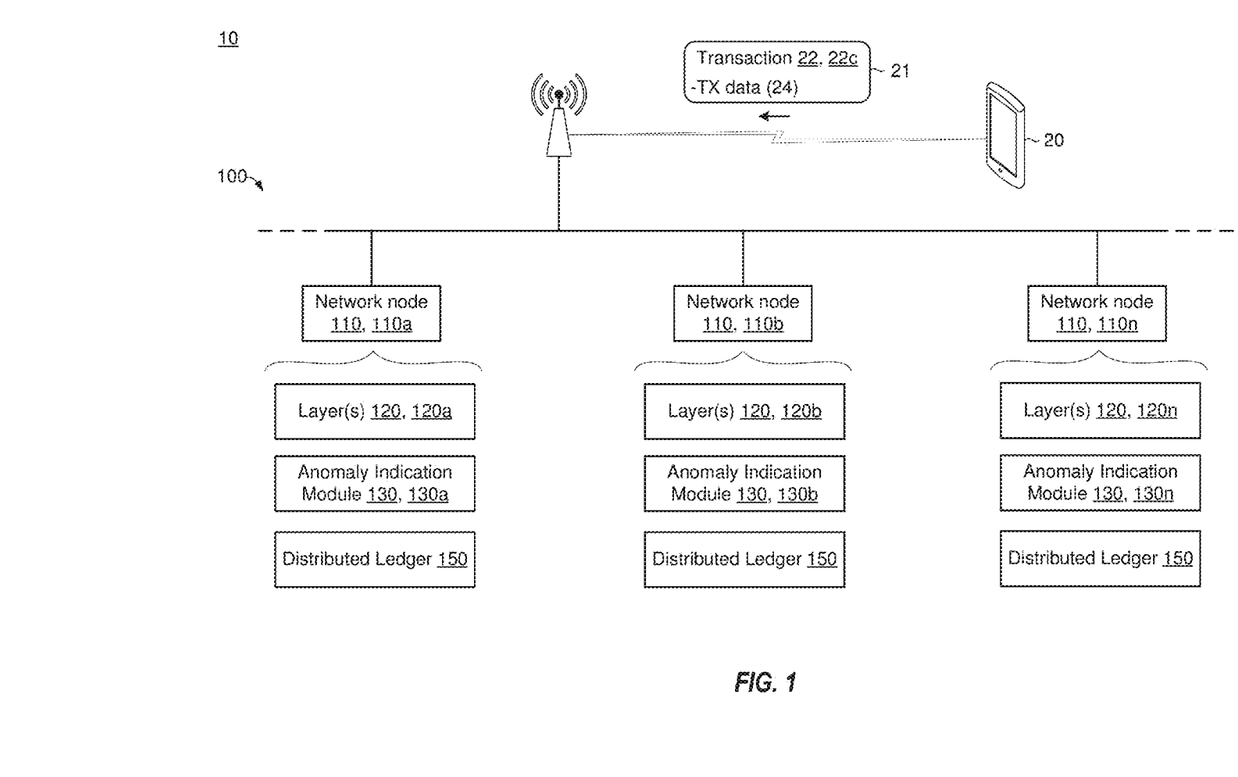
FIG. 1 is a schematic diagram of a distributed ledger environment that includes various network nodes that are configured to maintain a distributed ledger in accordance with some implementations.

FIG. 1 is a schematic diagram of a distributed ledger environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the distributed ledger environment 10 includes a client device 20 (e.g., a mobile communication device such as a smartphone, tablet computer, or a laptop computer), and a distributed ledger system 100. In various implementations, the distributed ledger system 100 includes various network nodes 110 (e.g., a first network node 110a, a second network node 110b . . . an nth network node 110n) that are configured to maintain a distributed ledger 150 in coordination with each other.

In various implementations, the client device 20 sends a transaction request 21 to the distributed ledger system 100. In various implementations, the transaction request 21 includes information associated with a transaction 22. For example, in some implementations, the transaction request 21 includes transaction data 24 that specifies details of the transaction 22. In some examples, the transaction 22 is a money transfer request between the client device 20 and another client device (not shown). In such examples, the transaction data 24 includes a wallet address of the client device 20, a wallet address of the other client device, and an amount. In some examples, the transaction 22 is a purchase for an item. In such examples, the transaction data 24 indicates the item, a price for the item, and a wallet address of the client device 20. In some examples, the transaction 22 indicated by the transaction request 21 is referred to as a current transaction 22c.

In various implementations, the distributed ledger system 100 receives the transaction request 21. For example, in some implementations, the network nodes 110 receive the transaction request 21. In some implementations, the network nodes 110 receive the transaction request 21 directly from the client device 20. However, in some implementations, some of the network nodes 110 receive the transaction request 21 through another network node 110. More generally, in various implementations, a network node 110 obtains a transaction indicator (e.g., the transaction request 21) including respective transaction data (e.g., the transaction data 24) for a current transaction 22c. In some implementations, the network node 110 obtains the transaction indicator directly from the client device 20. In some implementations, the network node 110 obtains the transaction indicator through another network node 110.

In various implementations, a network node 110 includes one or more layers 120, an anomaly indication module 130, and a copy of the distributed ledger 150. In various implementations, the network nodes 110 maintain the distributed ledger 150 in coordination with each other. In various implementations, the network nodes 110 store transactions 22 in the distributed ledger 150. As such, in various implementations, the distributed ledger 150 serves as a record of the transactions 22 that the distributed ledger system 100 receives, validates, and/or processes. In various implementations, a network node 110 (e.g., each network node 110) stores a copy of the distributed ledger 150. As such, in various implementations, there is no need for a centralized ledger. In some implementations, several network nodes 110 (e.g., all the network nodes 110) receive the transaction request 21, and one of the network nodes 110 initiates the storage of the transaction 22 in the distributed ledger 150. In various implementations, the transaction 22 is added to the distributed ledger 150 based on a consensus determination between the network nodes 110. For example, in some implementations, one of the network nodes 110 (e.g., the first network node 110a) stores the transaction 22 in the distributed ledger 150 in response to receiving permission to store the transaction 22 in the distributed ledger 150 from a threshold number/percentage (e.g., a majority) of the network nodes 110. In some implementations, the distributed ledger 150 is referred to as a ledger store (e.g., a distributed ledger store).

Figure 2A:
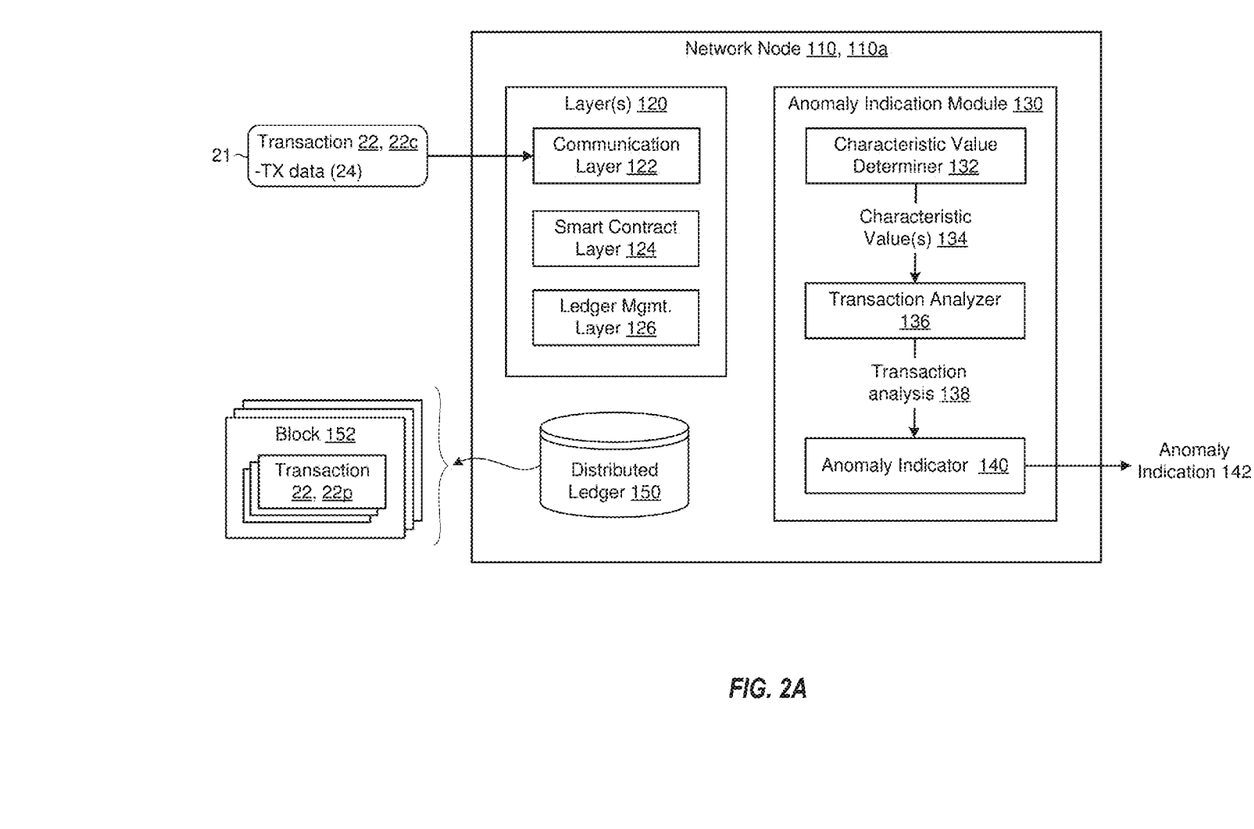
FIGS. 2A-D are block diagrams of a network node in accordance with some implementations.

In various implementations, a network node 110 includes one or more layers 120. For example, the first network node 110a includes a first set of layers 120a, the second network node 110b includes a second set of layers 120b, and the nth network node 110n includes an nth set of layers 120n. In various implementations, a layer 120 represents one or more components, devices and/or systems that provide a functionality. In various implementations, the layers 120 are hierarchical. For example, in some implementations, a first layer 120 serves a second layer 120 that is above the first layer 120, and the first layer 120 is served by a third layer 120 that is below the first layer 120. FIG. 2A illustrates example layers 120.

In various implementations, a network node 110 includes an anomaly indication module 130. For example, in some implementations, the first network node 110a includes a first anomaly indication module 130a, the second network node 110b includes a second anomaly indication module 130b, and the nth network node 110n includes an nth anomaly indication module 130b. In various implementations, the anomaly indication module 130 indicates anomalies in the distributed ledger system 100. For example, in some implementations, the anomaly indication module 130 indicates that there is an anomaly at one of the layers 120. In other words, in some implementations, the anomaly indication module 130 indicates a layer-level anomaly. In some implementations, the anomaly indication module 130 indicates that there is an anomaly at the network node 110. In other words, in some implementations, the anomaly indication module 130 indicates a node-level anomaly. In some implementations, the anomaly indication module 130 indicates that there is an anomaly throughout the distributed ledger system 100. In other words, in some implementations, the anomaly indication module 130 indicates a system-level anomaly. In various implementations, the anomaly indication module 130 indicates that there is an anomaly in response to determining that a current operation/state/behavior of a layer 120, a network node 110 and/or the distributed ledger system 100 deviates from an expected operation/state/behavior of the layer 120, the network node 110 and/or the distributed ledger system 100, respectively.

FIG. 2A is a block diagram of a network node 110 in accordance with some implementations. In various implementations, a network node 110 includes one or more layers 120, an anomaly indication module 130, and a copy of the distributed ledger 150. In various implementations, a layer 120 represents one or more components, devices and/or systems that perform a particular functionality. In some implementations, the layers 120 include a communication layer 122, a smart contract layer 124, and a ledger management layer 126. In various implementations, the communication layer 122 enables the network node 110 to receive and/or transmit data. For example, in some implementations, the communication layer 122 receives the transaction request 21. In various implementations, the smart contract layer 124 executes smart contracts. In various implementations, a smart contract refers to a conditional transaction that is associated with one or more conditions. In such implementations, the smart contract layer 124 executes the conditional transaction in response to determining that the condition associated with the conditional transaction has been satisfied. In various implementations, the ledger management layer 126 manages the distributed ledger 150. For example, in some implementations, the ledger management layer 126 maintains the distributed ledger 150 in coordination with other network nodes 110. In some implementations, the ledger management layer 126 is referred to as a ledger layer that interfaces with the distributed ledger 150.

In various implementations, the distributed ledger 150 stores various blocks 152. In various implementations, a block 152 includes a list of transactions 22. As such, in various implementations, the distributed ledger 150 serves as a record for the transactions 22 received by the distributed ledger system 100. In various implementations, a change to the distributed ledger 150 is permitted in response to determining that a threshold number/percentage (e.g., a majority) of the network nodes 110 agree to change. In other words, in various implementations, changes to the distributed ledger 150 are permitted in response to a consensus determination between a threshold number/percentage (e.g., a majority) of the network nodes 110. As such, those of ordinary skill in the art will appreciate from the present disclosure that, in various implementations, the distributed ledger 150 is considered an immutable record of transactions 22 processed by the distributed ledger system 100. In some examples, the transactions 22 stored in the distributed ledger 150 are referred to as previous transactions 22p.

In various implementations, the anomaly indication module 130 indicates anomalies in the distributed ledger system 100. For example, in some implementations, the anomaly indication module 130 indicates anomalies that occur throughout the distributed ledger system 100 (e.g., system-level anomalies), at the network node 110 (e.g., node-level anomalies), and/or at one of the layers 120 (e.g., layer-level anomalies). In various implementations, the anomaly indication module 130 includes a characteristic value determiner 132, a transaction analyzer 136, and an anomaly indicator 140. Briefly, in various implementations, the characteristic value determiner 132 determines a characteristic value 134, the transaction analyzer 136 determines a transaction analysis 138 for a current transaction 22c, and the anomaly indicator 140 synthesizes an anomaly indication 142 based on a function of the current transaction 22c in relation to the characteristic value 134 (e.g., based on a function of the transaction analysis 138 and the characteristic value 134).

In various implementations, the characteristic value determiner 132 determines one or more characteristic values 134 (e.g., a set of characteristic values 134). In various implementations, the characteristic value determiner 132 determines the characteristic value(s) 134 based on (e.g., as a function of) information associated with (e.g., stored in) the distributed ledger 150. In various implementations, a characteristic value 134 represents a historical benchmark for a particular value, action and/or transactions 22. For example, in some implementations, the characteristic value 134 represents a historical operation/state/behavior of a layer 120, a network node 110 and/or the distributed ledger system 100. In some implementations, the characteristic value 134 indicates transaction types of previous transactions 22p that are stored in the distributed ledger 150. In some implementations, the characteristic value 134 indicates a historical transaction frequency. In some examples, the characteristic value 134 indicates a historical transaction frequency for a particular type of transaction. In some examples, the characteristic value determiner 132 determines a characteristic value 134 for each type of transaction (e.g., a historical transaction frequency for each transaction type). In some implementations, the characteristic value 134 represents a reputation score associated with the transactions 22 stored in the distributed ledger 150. For example, in some implementations, each transaction 22 is associated with a reputation score, and the characteristic value 134 is a function of the individual reputations scores (e.g., the average/mean of individual reputation scores). In some implementations, the reputation score associated with a transaction 22 represents a reputation (e.g., trustworthiness) of a source of the transaction 22.

In some implementations, the characteristic value determiner 132 determines one or more characteristic values 134 as a function of operational run-time data. For example, in some implementations, the operational run-time data indicates a state/condition of the distributed ledger system 100, the network node(s) 110, the layer(s) 120 and/or the distributed ledger 150. In such implementations, the characteristic value(s) 134 indicates a benchmark state/condition for the distributed ledger system 100, the network node(s) 110, the layer(s) 120 and/or the distributed ledger 150. In some implementations, the characteristic value determiner 132 determines the characteristic value(s) 134 based on a function of the network node(s) 110. For example, in some implementations, a function of the first network node 110a is to communicate with other network nodes 110, and the characteristic value 134 indicates a benchmark frequency for the first network node 110a to communicate with the other network nodes 110. In some implementations, the characteristic value determiner 132 determines the characteristic value(s) 134 as a function of the relation between different layers 120. For example, in some implementations, the ledger management layer 126 records the execution of a smart contract in response to the smart contract layer 124 executing the smart contract. In some such implementations, the characteristic value 134 indicates a benchmark time for recording the execution of the smart contract.

In various implementations, the transaction analyzer 136 determines whether the current transaction 22c satisfies the characteristic value(s) 134. In various implementations, the transaction analyzer 136 analyzes the current transaction 22c, and synthesizes a transaction analysis 138. In various implementations, the transaction analysis 138 indicates whether the current transaction 22c satisfies the characteristic value(s) 134. For example, in some implementations, the transaction analyzer 136 determines whether a transaction type of the current transaction 22c matches (e.g., is the same as or similar to) one of the transaction types indicated by the characteristic value(s) 134. In some implementations, the transaction analyzer 136 determines whether a current transaction frequency breaches a function of a historical transaction frequency indicated by the characteristic value(s) 134. In some examples, the transaction analyzer 136 determines whether the current transaction frequency is within a threshold of the historical transaction frequency indicated by the characteristic value(s) 134. In some implementations, the transaction analyzer 136 determines whether a current reputation score associated with the current transaction 22c breaches a function of a historical reputation score indicated by the characteristic value(s) 134. In some examples, the transaction analyzer 136 determines whether the current reputation score is within a threshold of the historical reputation score indicated by the characteristic value(s) 134.

In various implementations, the anomaly indicator 140 indicates whether there is an anomaly based on a function of the current transaction 22c in relation to the characteristic value(s) 134. In various implementations, the anomaly indicator 140 indicates that there is an anomaly by synthesizing an anomaly indication 142. In some implementations, the anomaly indicator 140 indicates whether there is an anomaly based on a function of the transaction analysis 138. In such implementations, the anomaly indicator 140 synthesizes the anomaly indication 142 in response to determining that the transaction analysis 138 indicates that the current transaction 22c does not satisfy the characteristic value(s) 134. In some implementations, the anomaly indicator 140 foregoes synthesizing the anomaly indication 142 in response to determining that the transaction analysis 138 indicates that the current transaction 22c satisfies the characteristic value(s) 134. In various implementations, the anomaly indication 142 indicates whether the anomaly includes a system-level anomaly, a node-level anomaly, and/or a layer-level anomaly. In various implementations, the anomaly indicator 140 transmits the anomaly indication 142 to other network nodes 110 in the distributed ledger system 100. In various implementations, the anomaly indicator 140 transmits the anomaly indication 142 to an administrator of the first network node 110a.

In various implementations, the layers 120 are associated with the characteristic values 134 (e.g., each layer 120 is associated with a characteristic value 134). For example, in some implementations, the communication layer 122 is associated with a first characteristic value 134, the smart contract layer 124 is associated with a second characteristic value 134, and the ledger management layer 126 is associated with a third characteristic value 134. In some implementations, a characteristic value 134 associated with a layer 120 indicates an expected operation/state/behavior of the layer 120. In some implementations, the transaction analysis 138 indicates how the current transaction 22c was processed by the layers 120. In such implementations, the anomaly indication 142 indicates whether there is an anomaly at one of the layers 120 based on a function of the characteristic values 134 associated with the layers 120 and the transaction analysis 138. For example, the anomaly indicator 140 synthesizes the anomaly indication 142 to indicate an anomaly at a layer 120 in response to the transaction analysis 138 indicating that the layer 120 did not process the current transaction 22c as expected (e.g., according to the characteristic value 134 associated with the layer 120).

Figure 2B:
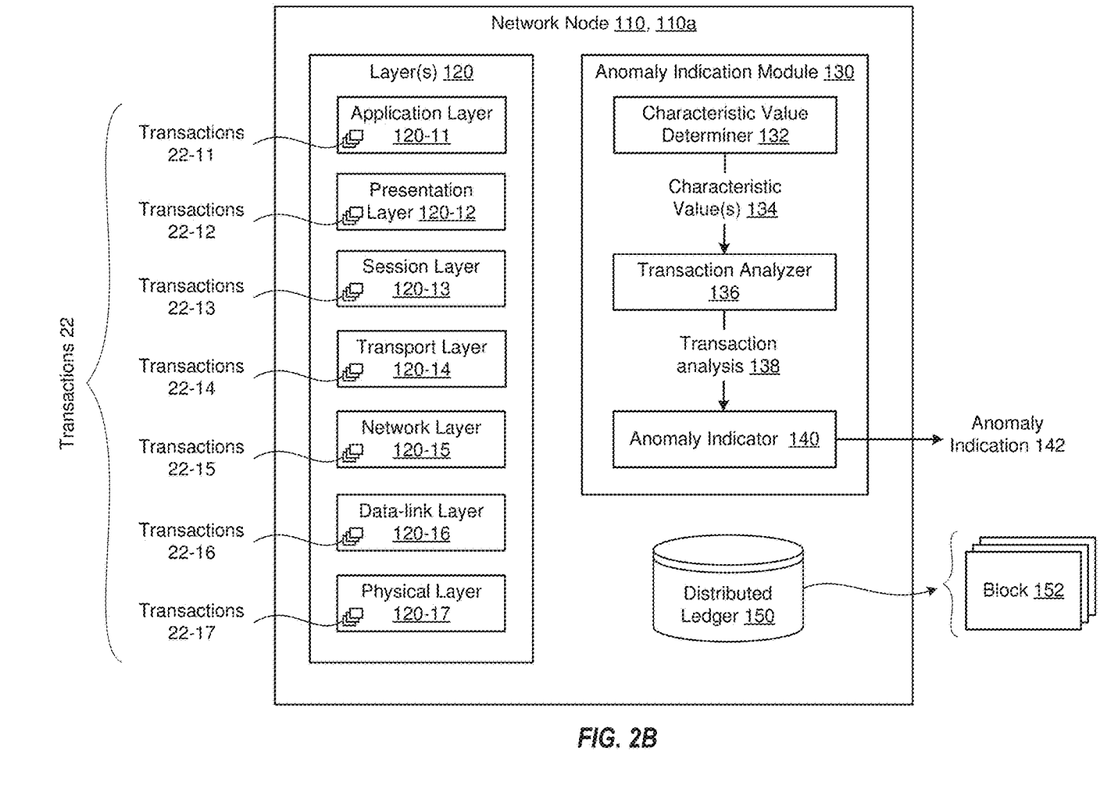

FIG. 2B is a block diagram of a network node 110 in accordance with some implementations. In various implementations, the layers 120 correspond with layers of the Open Systems Interconnection (OSI) model. For example, as illustrated in FIG. 2B, in various implementations, the layers 120 include an application layer 120-11, a presentation layer 120-12, a session layer 120-13, a transport layer 120-14, a network layer 120-15, a data-link layer 120-16, and a physical layer 120-17. In various implementations, the layers 120 (e.g., each layer 120) process transactions 22 (e.g., transactions 22-11, 22-12 . . . 22-17). For example, in various implementations, the layers 120, individually and/or in coordination with each other, validate the transactions 22 and/or add the transactions 22 to the distributed ledger 150. In some implementations, a transaction 22 arrives at the network node 110 through one of the layers 120 (e.g., the physical layer 120-17), and propagates through one or more other layers 120. In some implementations, a transaction 22 arrives at the network node 110 through one of the layers 120 (e.g., the application layer 120-11), and is processed by that layer 120.

In various implementations, some transactions 22 are associated with a particular layer 120. For example, in some implementations, transactions 22-11 are associated with the application layer 120-11, transactions 22-12 are associated with the presentation layer 120-12, transactions 22-13 are associated with the session layer 120-13, transactions 22-14 are associated with the transport layer 120-14, transactions 22-15 are associated with the network layer 120-15, transactions 22-16 are associated with the data-link layer 120-16, and transactions 22-17 are associated with the physical layer 120-17. In various implementations, a layer 120 processes transactions 22 that are associated with the layer 120 (e.g., the layer 120 receives, validates, and/or stores the transactions 22 in a block 152). As such, in various implementations, a block 152 includes transactions 22 that are associated with various layers 120. For example, in some implementations, a block 152 includes a combination of transactions 22-11, 22-12 . . . 22-17. In various implementations, a block 152 includes transactions 22 that are associated with a particular layer 120. For example, in some implementations, a block 152 includes transactions 22-11, another block 152 includes transactions 22-12, etc. In some implementations, the distributed ledger 150 refers to a collection of distributed ledgers. In such implementations, transactions 22 associated with different layers 120 are stored in different distributed ledgers (e.g., transactions 22 associated with a particular layer 120 are stored in a distributed ledger that corresponds with that particular layer).

In various implementations, the characteristic values 134 are layer-specific. In other words, in various implementations, the characteristic value determiner 132 determines different characteristic values 134 for different layers 120. In some implementations, the characteristic value determiner 132 determines a characteristic value 134 for each layer 120. In various implementations, the transaction analysis 138 indicates a performance of the layers 120 in relation to the characteristic values 134. In some implementations, the transaction analysis 138 indicates a performance of each layer 120 in relation to a characteristic value 134 that corresponds with the layer 120. In various implementations, the anomaly indicator 140 synthesizes the anomaly indication 142 based on a function of the transaction analysis 138 in relation to the characteristic values 134. For example, in some implementations, the anomaly indication 140 synthesizes an anomaly indication 142 that indicates an anomaly at one of the layers 120 in response to the transaction analysis 138 indicating that the layer is not performing as expected (e.g., as indicated by the characteristic value 134 that corresponds with the layer 120).

Figure 2C:
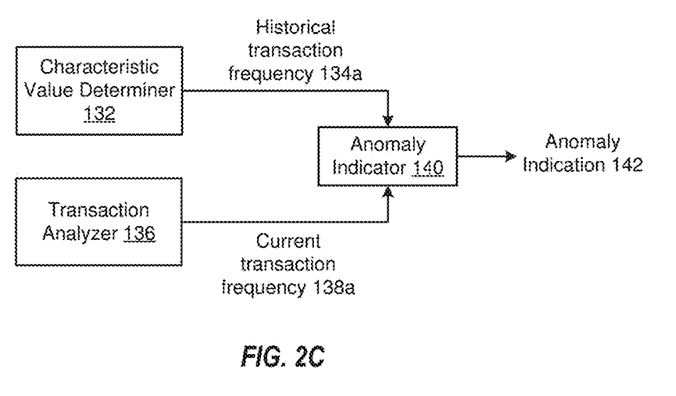
Figure 2D:
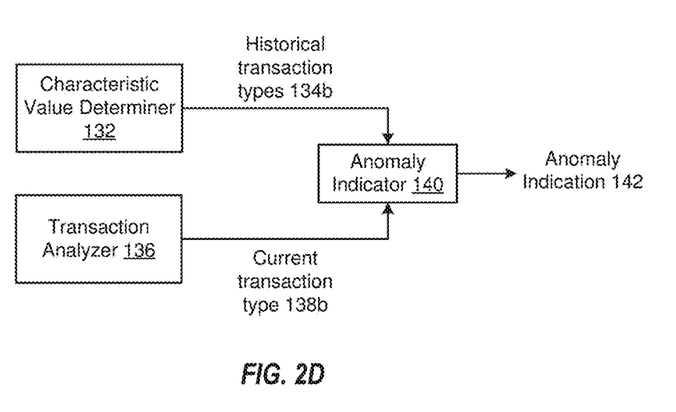

FIGS. 2C-D are block diagrams of a network node 110 (e.g., the first network node 110a shown in FIGS. 1 and 2A) in accordance with some implementations. As illustrated in FIG. 2C, in various implementations, the characteristic value determiner 132 determines a historical transaction frequency 134a based on the information associated with (e.g., stored in) the distributed ledger 150. In some implementations, the historical transaction frequency 134a indicates a frequency of occurrence for the previous transactions 22p stored in the distributed ledger 150. In some implementations, the transaction analyzer 136 determines a current transaction frequency 138a based on a timing of the current transaction 22c in relation to timings of previous transactions 22p. In some implementations, the anomaly indicator 140 synthesizes an anomaly indication 142 in response to the current transaction frequency 138a breaching a function of the historical transaction frequency 134a. For example, the anomaly indicator 140 synthesizes an anomaly indication 142 in response to a difference between the historical transaction frequency 134a and the current transaction frequency 138a being greater than a threshold.

As illustrated in FIG. 2D, in various implementations, the characteristic value determiner 132 determines historical transaction types 134b based on the information associated with (e.g., stored in) the distributed ledger 150. For example, in some implementations, the historical transaction types 134b indicate that the previous transactions 22p stored in the distributed ledger include money transfer transactions and retail purchase transactions. In some implementations, the transaction analyzer 136 determines a current transaction type 138b that indicates a transaction type of the current transaction 22c. In various implementations, the anomaly indicator 140 synthesizes an anomaly indication 142 based on a function of the current transaction type 138b and the historical transaction type(s) 134b. For example, in some implementations, the anomaly indicator 140 synthesizes the anomaly indication 142 in response to the current transaction type 138b being different from the historical transaction type(s) 134b. In some examples, the anomaly indicator 140 synthesizes the anomaly indication 142 in response to the current transaction type 138b being a vehicle registration transaction, whereas the historical transaction types 134b include money transfer transactions and retail purchase transactions.

Figure 3:
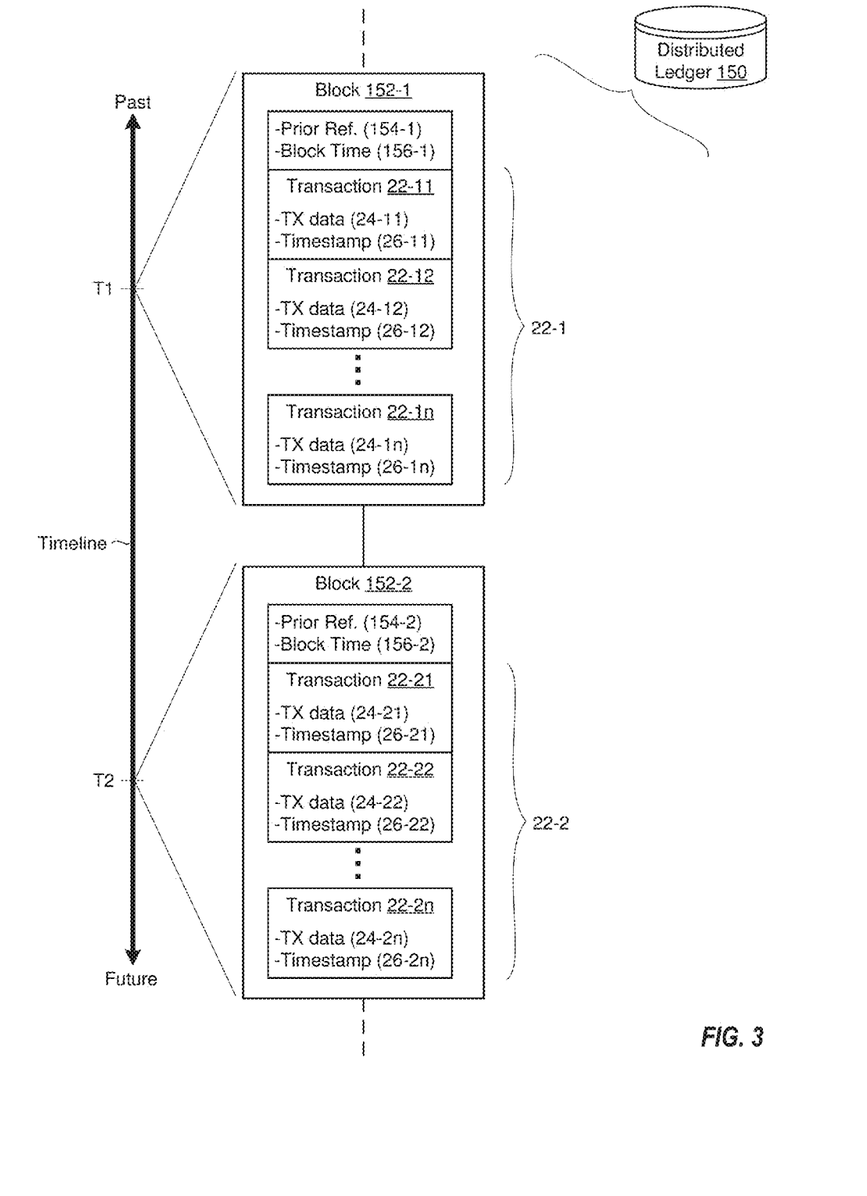
FIG. 3 is a block diagram of a distributed ledger in accordance with some implementations.

FIG. 3 is a block diagram of a distributed ledger 150 in accordance with some implementations. This example implementation illustrates a first block 152-1 and a second block 152-2. As illustrated by the timeline, the first block 152-1 was added to the distributed ledger 150 at time T1, and the second block 152-2 was added to the distributed ledger 150 at time T2. In various implementations, the distributed ledger system 100 controls a time difference between block additions. In various implementations, the first block 152-1 includes a reference 154-1 to a prior block (not shown), and the second block 152-2 includes a reference 154-2 to the first block 152-1. In various implementations, the first block 152-1 includes a block timestamp 156-1 that indicates a time (e.g., T1) at which the first block 152-1 was added to the distributed ledger 150. Similarly, the second block 152-2 includes a block timestamp 156-2 that indicates a time (e.g., T2) at which the second block 152-2 was added to the distributed ledger 150.

In various implementations, the first block 152-1 includes a first set of transactions 22-11, 22-12 . . . 22-1n (collectively, transactions 22-1). The transactions 22-1 include respective transaction data 24-11, 24-12 . . . 24-1n, and respective transaction timestamps 26-11, 26-12 . . . 26-1n. Similarly, the second block 152-2 includes a second set of transactions 22-21, 22-22 . . . 22-2n (collectively, transactions 22-2). The transactions 22-2 include respective transaction data 24-21, 24-22 . . . 24-2n, and respective transaction timestamps 26-21, 26-22 . . . 26-2n. In various implementations, the transaction timestamps 26-11, 26-12 . . . 26-2n represent times at which the distributed ledger system 100 received and/or validated the respective transactions 22, whereas the block timestamps 156 represents times at which the respective blocks 162 were created. As such, in some implementations, the transaction timestamps 26-11, 26-12 . . . 26-2n are different from the block timestamps 156. Alternatively, in some implementations, the transaction timestamps 26-11, 26-12 . . . 26-2n are the same as the block timestamps 156.

Figure 4:
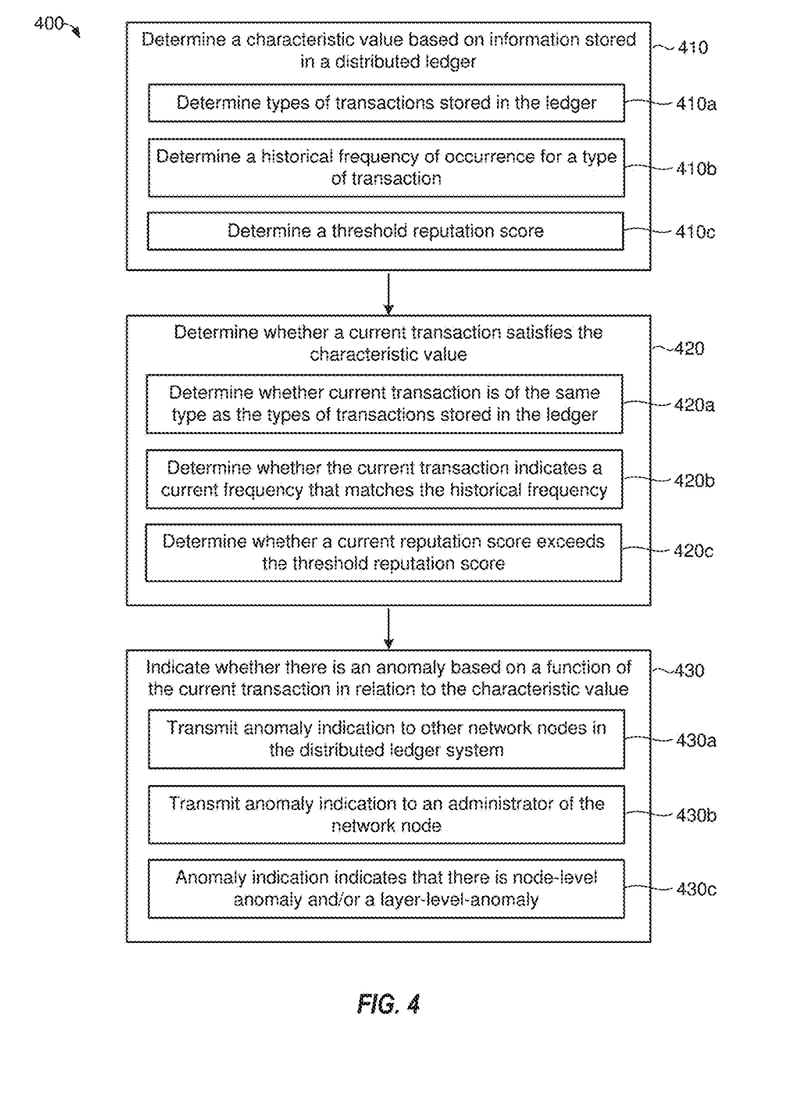
FIG. 4 is a flowchart representation of a method of indicating anomalies in accordance with some implementations.

FIG. 4 is a flowchart representation of a method 400 of indicating anomalies in a distributed ledger system in accordance with some implementations. In various implementations, the method 400 is implemented as a set of computer readable instructions that are executed at a network node (e.g., the network node 100 shown in FIGS. 1 and 2A). Briefly, the method 400 includes determining a characteristic value based on information associated with (e.g., stored in) a distributed ledger, determining whether a current transaction satisfies the characteristic value, and indicating whether there is an anomaly based on a function of the current transaction in relation to the characteristic value.

As represented by block 410, in various implementations, the method 400 includes determining a characteristic value (e.g., the characteristic value(s) 134 shown in FIGS. 2A-C) based on information associated with (e.g., stored in) a distributed ledger (e.g., the distributed ledger 150 shown in FIGS. 1 and 2A). In various implementations, determining the characteristic value includes determining an expected operation/state/behavior of the distributed ledger system, a network node of the distributed ledger system, and/or a layer of the network node. As represented by block 410a, in various implementations, the method 400 includes determining the types of transactions that are stored in the distributed ledger. In other words, in various implementations, the method 400 includes determining historical transaction types (e.g., the historical transaction types 134b shown in FIG. 2D).

As represented by block 410b, in various implementations, the method 400 includes determining a historical frequency of occurrence (e.g., the historical transaction frequency 134a shown in FIG. 2D) for a type of transaction. For example, in some implementations, the method 400 includes determining a current transaction type of the current transaction, and determining a historical frequency of occurrence for the current transaction type. As represented by block 410c, in various implementations, the method 400 includes determining a reputation score associated with the transactions stored in the distributed ledger. In some implementations, some transactions are associated with corresponding reputation scores that indicate the reputation of devices/nodes that initiated the transactions. In such implementations, the method 400 includes determining a historical reputation score based on a function of the individual reputation scores (e.g., by determining the average or the mean of various individual reputation scores).

As represented by block 420, in various implementations, the method 400 includes determining whether a current transaction (e.g., the current transaction 22c shown in FIGS. 1 and 2A) satisfies the characteristic value(s) (e.g., the characteristic value(s) 134 shown in FIGS. 2A-C). In various implementations, the method 400 includes determining whether a current operation/state/behavior of the distributed ledger system, a network node of the distributed ledger system and/or a layer of a network node breaches a function of an expected operation/state/behavior (e.g., the expected operation/state/behavior indicated by the characteristic value(s)). As represented by block 420a, in various implementations, the method 400 includes determining whether a current transaction type of the current transaction breaches a function of historical transaction types of previous transactions that are stored in the distributed ledger. For example, in some implementations, the method 400 includes determining whether a current transaction type of the current transaction is the same as the transaction type of previous transactions that are stored in the distributed ledger.

As represented by block 420b, in various implementations, the method 400 includes determining whether a current transaction frequency indicated by a timing of the current transaction breaches a function of a historical transaction frequency. For example, in some implementations, the method 400 includes determining whether a difference between the current transaction frequency and the historical transaction frequency is greater than a threshold. As represented by block 420c, in various implementations, the method 400 includes determining whether a current reputation score associated with the current transaction breaches a function of a historical reputation score associated with previous transactions that are stored in the distributed ledger. For example, in some implementations, the method 400 includes determining whether the current reputation score is within a threshold range of the historical reputation score. In some implementations, the method 400 includes determining whether the current reputation score is greater than a threshold reputation score.

As represented by block 430, in various implementations, the method 400 includes indicating whether there is an anomaly based on a function of the current transaction in relation to the characteristic value. For example, in some implementations, the method 400 includes indicating that there is an anomaly in response to the current transaction not satisfying the characteristic value. In some implementations, the method 400 includes foregoing the anomaly indication in response to the current transaction satisfying the characteristic value. In some implementations, the method 400 includes determining a numerical value based on the current transaction (e.g., a current transaction frequency). In such implementations, the method 400 includes indicating that there is an anomaly in response to a difference between the numerical value (e.g., the current transaction frequency) and the characteristic value (e.g., historical transaction frequency) being greater than a threshold. In some implementations, the method 400 includes determining a string based on the current transaction (e.g., a current transaction type). In such implementations, the method 400 includes indicating that there is an anomaly in response to the string (e.g., the current transaction type) being different from the characteristic value (e.g., the historical transaction types).

As represented by block 430a, in various implementations, the method 400 includes transmitting the anomaly indication to other network nodes in the distributed ledger system. As represented by block 430b, in various implementations, the method 400 includes transmitting the anomaly indication to an administrator of the network node. As represented by block 430c, in various implementations, the method 400 includes indicating whether the anomaly is at the system-level (e.g., throughout the distributed ledger system), the node-level (e.g., at a particular network node in the distributed ledger system), and/or the layer level (e.g., at a particular layer of a network node). As such, in various implementations, the anomaly indication includes a hierarchy of anomaly indications. In some examples, the hierarchy of anomaly indications includes a system-level anomaly indication, one or more node-level anomaly indications for one or more network nodes, and one or more layer-level anomaly indications for each of the anomalous network nodes. In various implementations, the method 400 includes indicating a layer-level anomaly in response to the current transaction not satisfying a characteristic value that is associated with a layer. In various implementations, the method 400 includes indicating a node-level anomaly in response an occurrence of a combination of layer-level anomalies.

Figure 5:
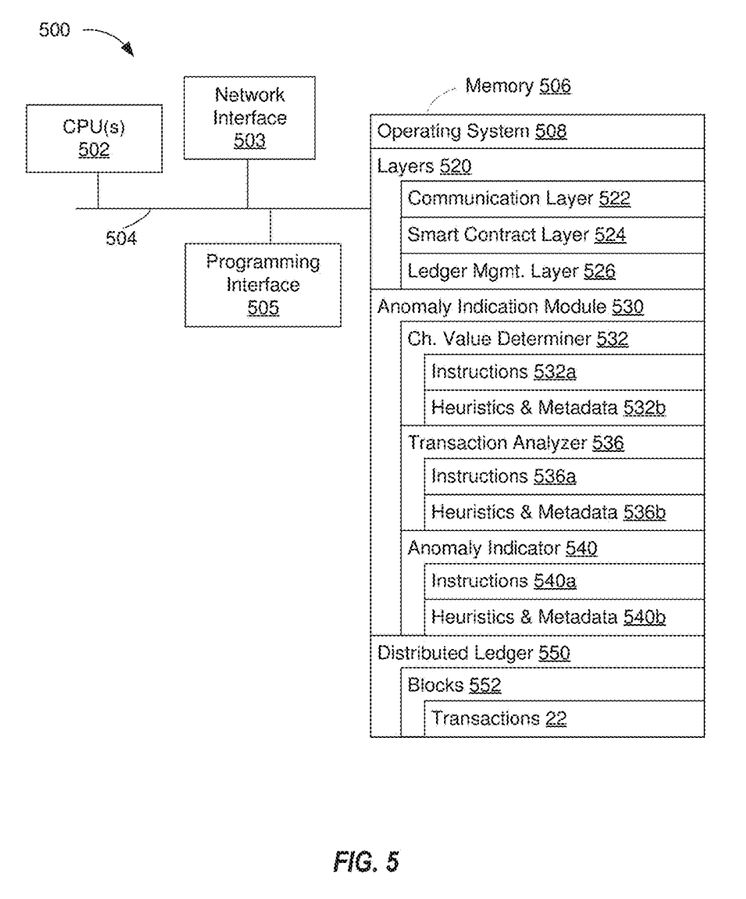
FIG. 5 is a block diagram of a server system enabled with various modules that are provided to indicate anomalies in a distributed ledger system in accordance with some implementations.

FIG. 5 is a block diagram of a server system 500 enabled with one or more components of a network node (e.g., the network node shown in FIGS. 1 and 2A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 502, a network interface 503, a programming interface 505, a memory 506, and one or more communication buses 504 for interconnecting these and various other components.

In some implementations, the network interface 503 is provided to, among other uses, establish and maintain a metadata tunnel between a cloud hosted network management system and at least one private network including one or more compliant devices. In some implementations, the communication buses 504 include circuitry that interconnects and controls communications between system components. The memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium.

In some implementations, the memory 506 or the non-transitory computer readable storage medium of the memory 506 stores the following programs, modules and data structures, or a subset thereof including an optional operating system 508, one or more layers 520, an anomaly indication module 530, and a copy of the distributed ledger 550. In various implementations, the one or more layers 520, the anomaly indication module 530, and the copy of the distributed ledger 550 are similar to the one or more layers 120, the anomaly indication module 130, and the copy of the distributed ledger 150, respectively, shown in FIG. 2A. In various implementations, the layers 520 include a communication layer 522, a smart contract layer 524, and a ledger management layer 526. In various implementations, the communication layer 522, the smart contract layer 524 and the ledger management layer 526 are similar to the communication layer 122, the smart contract layer 124 and the ledger management layer 126, respectively, shown in FIG. 2A.

In various implementations, the anomaly indication module 530 includes a characteristic value determiner 532, a transaction analyzer 536, and an anomaly indicator 540. In various implementations, the characteristic value determiner 532, the transaction analyzer 536 and the anomaly indicator 540 are similar to the characteristic value determiner 132, the transaction analyzer 136 and the anomaly indicator 140, respectively, shown in FIG. 2A. In various implementations, the characteristic value determiner 532 determines one or more characteristic values (e.g., the characteristic value(s) 134 shown in FIG. 2A). To that end, in various implementations, the characteristic value determiner 532 includes instructions and/or logic 532a, and heuristics and metadata 532b. In various implementations, the transaction analyzer 536 determines whether a current transaction satisfies the characteristic value(s) determined by the characteristic value determiner 532. To that end, in various implementations, the transaction analyzer 536 includes instructions and/or logic 536a, and heuristics and metadata 536b. In various implementations, the anomaly indicator 540 indicates whether there is an anomaly based on a function of the current transaction in relation to the characteristic value(s). To that end, in various implementations, the anomaly indicator 540 includes instructions and/or logic 540a, and heuristics and metadata 540b. In various implementations, the distributed ledger 550 is similar to the distributed ledger 150 shown in FIG. 2A. To that end, the distributed ledger 550 stores transactions 22 in blocks 552 that are similar to the blocks 152 shown in FIG. 2A.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a first network node of a plurality of network nodes that are configured to maintain respective copies of a distributed ledger, the first network node including one or more processors, a non-transitory memory that stores a first copy of the distributed ledger and one or more network interfaces:
        determining, by the one or more processors of the first network node, a characteristic value based on information associated with the first copy of the distributed ledger, wherein each copy of the distributed ledger stores blocks of transactions that were added to each copy of the distributed ledger based on a consensus determination between the plurality of network nodes;
        determining, by the one or more processors of the first network node, whether a current transaction satisfies the characteristic value;
        generating, by the one or more processors of the first network node, an anomaly indication indicating whether there is an anomaly based on a function of the current transaction in relation to the characteristic value;
        determining, by the one or more processors of the first network node, whether to add the current transaction to the distributed ledger based on the the anomaly indication; and
        transmitting, via the one or more network interfaces of the first network node, the anomaly indication to other network nodes of the plurality of network nodes.

2. The method of claim 1, wherein determining the characteristic value comprises:
    determining types of transactions that are stored in the first copy of the distributed ledger.

3. The method of claim 2, wherein determining whether the current transaction satisfies the characteristic value comprises:
    determining whether the current transaction to be added to the distributed ledger is of the same type as one of the types of transactions stored in the first copy of the distributed ledger.

4. The method of claim 2, wherein the generating comprises:
    generating the anomaly indication in response to determining that the current transaction is of a different type from the types of transactions stored in the distributed ledger.

5. The method of claim 1, wherein determining the characteristic value comprises:
    determining a historical frequency of occurrence for a type of transaction.

6. The method of claim 5, wherein the generating comprises:
    generating the anomaly indication in response to the current transaction indicating a current frequency of occurrence that is different from the historical frequency.

7. The method of claim 1, wherein the first network node comprises a plurality of layers; and wherein determining the characteristic value comprises:
    determining a plurality of characteristic values corresponding with respective layers of the first network node.

8. The method of claim 7, wherein the generating comprises at least one of:
    generating an indication of a layer-level anomaly in response to the current transaction not satisfying at least one of the plurality of characteristic values; and
    generating an indication of a node-level anomaly in response to the current transaction not satisfying a combination of the plurality of characteristic values.

9. The method of claim 7, further comprising:
    determining a first characteristic value for a ledger layer that interfaces with the distributed ledger;
    determining a second characteristic value for a smart contract layer that is configured to execute a smart contract in response to determining that a condition associated with the smart contract has been satisfied; and
    determining that a third characteristic value for a communication layer that is configured to communicate with the other network nodes of the plurality of network nodes.

10. The method of claim 1, further comprising:
    causing the current transaction to be added to the distributed ledger based on a consensus determination between the plurality of network nodes and an indication that there is not an anomaly.

11. A network node configured to maintain a distributed ledger in coordination with a plurality of network nodes, the network node comprising:
    a processor configured to execute computer readable instructions including on a non-transitory memory; and
    a non-transitory memory including a first copy of the distributed ledger and computer-readable instructions, that when executed by the processor, cause the network node to:

determine a characteristic value based on information associated with the first copy of the distributed ledger, wherein the plurality of network nodes store respective copies of the distributed ledger and each copy of the distributed ledger stores blocks of transactions that were added to each copy of the distributed ledger based on a consensus determination between the plurality of network nodes;

determine whether a current transaction to be added to the distributed ledger satisfies the characteristic value;

generate an anomaly indication indicating whether there is an anomaly based on a function of the current transaction in relation to the characteristic value;

determine whether to add the current transaction to the distributed ledger based on the anomaly indication; and transmit the anomaly indication to other network nodes of the plurality of network nodes.

12. The network node of claim 11, wherein the computer readable instructions cause the network node to determine the characteristic value by:

determining types of transactions that are stored in the first copy of the distributed ledger.

13. The network node of claim 12, wherein the computer readable instructions cause the network node to determine whether the current transaction satisfies the characteristic value by:

determining whether the current transaction is of the same type as one of the types of transactions stored in the first copy of the distributed ledger.

14. The network node of claim 12, wherein the computer readable instructions cause the network node to generate the anomaly indication by:

anomaly generating the anomaly indication in response to determining that the current transaction is of a different type from the types of transactions stored in the distributed ledger.

15. The network node of claim 11, further comprising a plurality of layers; and wherein the computer readable instructions cause the network node to determine the characteristic value by:

determining a plurality of characteristic values corresponding with respective layers of the network node.

16. The network node of claim 15, wherein the computer readable instructions cause the network node to generate the anomaly indication by:

generating an indication of a layer-level anomaly in response to the current transaction not satisfying at least one of the plurality of characteristic values; and generating an indication of a node-level anomaly in response to the current transaction not satisfying a combination of the plurality of characteristic values.

17. The network node of claim 15, wherein the computer readable instructions cause the network node to determine the plurality of characteristic values by:

determining a first characteristic value for a ledger layer management layer that is configured to manage the distributed ledger in coordination with other network nodes of the plurality of network nodes;

determining a second characteristic value for a smart contract layer that is configured to execute a smart contract in response to determining that a condition associated with the smart contract has been satisfied; and determining that a third characteristic value for a communication layer that is configured to communicate with the other network nodes of the plurality of network nodes.

18. A distributed ledger system comprising:

a plurality of network nodes that are configured to maintain respective copies of a distributed ledger in coordination with each other, wherein a first network node of the plurality of network nodes comprises:

a processor configured to execute computer readable instructions including on a non-transitory memory; and a non-transitory memory including a first copy of the distributed ledger and computer-readable instructions, that when executed by the processor, cause the network node to:

determine a characteristic value based on information associated with the first copy of the distributed ledger, wherein each copy of the distributed ledger stores blocks of transactions that were added to each copy of the distributed ledger based on a consensus determination between the plurality of network nodes;

determine whether a current transaction to be added to the distributed ledger satisfies the characteristic value;

indicate generate an anomaly indication indicating whether there is an anomaly based on a function of the current transaction in relation to the characteristic value;

determine whether to add the current transaction to the distributed ledger based on the anomaly indication; and transmit the anomaly indication to other network nodes of the plurality of network nodes.

19. The distributed ledger system of claim 18, wherein the first network node further comprises a plurality of layers; and wherein the computer readable instructions cause the first network node to determine the characteristic value by:

determining a plurality of characteristic values corresponding with respective layers of the first network node.

20. The distributed ledger system of claim 19, wherein the computer readable instructions cause the first network node to generate the anomaly indication by:

generating an indication of a layer-level anomaly in response to the current transaction not satisfying at least one of the plurality of characteristic values; and generating an indication of a node-level anomaly in response to the current transaction not satisfying a combination of the plurality of characteristic values.

* * * * *